(12) United States Patent
Kotalwar et al.

(10) Patent No.: US 9,166,903 B2
(45) Date of Patent: Oct. 20, 2015

(54) SYSTEM, METHOD AND APPARATUS TO RESOLVE RPF-VECTOR ATTRIBUTE CONFLICTS

(71) Applicants: Jayant Kotalwar, Mountain View, CA (US); Siva Kollipara, Mountain View, CA (US)

(72) Inventors: Jayant Kotalwar, Mountain View, CA (US); Siva Kollipara, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 140 days.

(21) Appl. No.: 13/717,982

(22) Filed: Dec. 18, 2012

(65) Prior Publication Data

US 2014/0169366 A1 Jun. 19, 2014

(51) Int. Cl.
*H04L 12/761* (2013.01)
*H04L 12/18* (2006.01)
*H04L 12/773* (2013.01)
*H04L 12/703* (2013.01)
*H04L 12/753* (2013.01)
*H04L 12/715* (2013.01)

(52) U.S. Cl.
CPC .............. *H04L 45/16* (2013.01); *H04L 12/185* (2013.01); *H04L 45/04* (2013.01); *H04L 45/28* (2013.01); *H04L 45/48* (2013.01); *H04L 45/60* (2013.01)

(58) Field of Classification Search
CPC ......... H04L 45/00; H04L 45/16; H04L 45/28; H04L 45/60
See application file for complete search history.

(56) References Cited

U.S. PATENT DOCUMENTS

| 2009/0073994 A1* | 3/2009 | Qureshi et al. ................. 370/401 |
| 2009/0135820 A1 | 5/2009 | Suzuki |
| 2010/0054245 A1* | 3/2010 | Asati et al. ..................... 370/390 |

OTHER PUBLICATIONS

The International Search Report and The Written Opinion of the International Searching Authority, or The Declaration, in PCT/US2013/072184, mailed Mar. 24, 2014; Alcatel Lucent, Applicant, 12 pages.
IJ Wijnands A Boers E Rosen Cisco Systems et al: "The Reverse Path Forwarding (RPF) Vector TLV; rfc5496.txt", The Reverse Path Forwarding (RPF) Vector TLV; RFC5496.TXT, Internet Engineering Task Force, IETF; Standard, Internet Society (ISOC) 4, Rue Des Falaises CH-1205 Geneva, Switzerland, Mar. 1, 2009, XP015065534 [retrieved on Mar. 27, 2009].
Atlas A et al: "An Architecture for Multicast Protection Using Maximally Redundant Trees; draft-atlas-rtgwg-mrt-mc-arch-00.txt", An Architecture for Multicast Protection Using Maximally Redundant Trees; Draft-Atlas-RTGWG-MRT-MC-ARCH-00.TXT, Internet Engineering Task Force, IETF; Standardworkingdraft, Internet Society (ISOC) 4, Rue Des Falaises Ch- 1205 Geneva, Switzerland, Mar. 5, 2012, pp. 1-29, XP015081025 [retrieved on Mar. 5, 2012].

(Continued)

*Primary Examiner* — David Oveissi
(74) *Attorney, Agent, or Firm* — Wall & Tong, LLP

(57) ABSTRACT

Systems, methods and apparatus to resolve join packet RPF vector attribute conflicts in a network by adding an identified proxy to a proxy list, the proxy being valid if it is reachable and if a valid PIM adjacency exists on one of the next route hops, and selecting one of multiple valid proxies within the proxy list according to a hierarchy of selection mechanisms.

23 Claims, 3 Drawing Sheets

(56) References Cited

OTHER PUBLICATIONS

Yiqun Cai Liming Wei Heidi Ou Cisco Systems et al: "Protocol Independent Multicast ECMP Assert; draft-ietf-pim-ecmp-00.txt", Protocol Independent Multicast ECMP Assert; Draft-IETF-PIM-ECMP-00, Txt, Internet Engineering Task Force, IETF; Standardworkingdraft, Internet Society (ISOC) 4, Rue Des Falaises CH- 1205 Geneva, Switzerland, Aug. 31, 2011, p. 1-11, XP015077854 [Retrieved on Aug. 31, 2011].

Boers I Wijnands E Rosen Cisco Systems A et al: "The Protocol Independent Multicast (PIM) Join Attribute Format; rfc5384.txt", The Protocol Independent Multicast (PIM) Join Attribute Format; RFC5384.TXT, Internet Engineering Task Force, IETF; Standard, Internet Society (ISOC) 4, Rue Des Falaises CH- 1205 Geneva, Switzerland, Nov. 1, 2008, XP015060358.

* cited by examiner

SYSTEM, METHOD AND APPARATUS TO RESOLVE RPF-VECTOR ATTRIBUTE CONFLICTS

FIELD OF THE INVENTION

The invention relates generally to Protocol Independent Multicast (PIM) and, more particularly but not exclusively, to Multicast Distribution Tree (MDT) traffic path management.

BACKGROUND

A Multicast Distribution Tree (MDT) or "tree" is used to connect a source or transmitter router to all destination or receiver routers. The source or transmitter router forms the root node of the MDT, while the destination or receiver routers form the leaf nodes of the MDT.

One way of creating an MDT is by using Protocol Independent Multicast (PIM). Nodes may join and leave a MDT at any time using PIM Join/Prune messages, as described in more detail in the various related Internet Engineering Task Force (IETF) protocols. A PIM Join message sent by a given node identifies one or more multicast distribution trees that that node wishes to join. Each tree is identified by the combination of a multicast group address and a source address (where the source address is possibly a "wild card"). Under certain conditions it can be useful, when joining a tree, to specify additional information or attributes related to the construction of a desired tree to be joined, such as a desired Reverse Path Forwarding (RPF) vector attribute as detailed in IETF Request for Comment (RFC) 5496. The RPF vector attribute specifies a proxy address or "proxy" to reach the source address.

IETF RFC 5384 of November 2008 entitled "The Protocol Independent Multicast (PIM) Join Attribute Format" describes a modification of the Join message that allows a node to associate attributes with a particular tree. The attributes are encoded in Type-Length-Value format.

Since it is possible for a router to receive conflicting attribute information from different downstream routers for the same type, RFC 5384 contemplates a "Conflicting Attribute" default procedure. Specifically, attribute information propagated upstream that results in conflicting attribute preferences is resolved via a tie-breaking mechanism to select the "better" attribute (e.g., selecting based upon the attribute from the PIM adjacency with the numerically smallest IP address). When a particular attribute type is specified, the specification may include a conflict resolution procedure specific to that type. If so, that conflict resolution procedure must be used instead of the RFC 5384 default procedure.

Thus, each time a "better" proxy is learned in the RPF vector attribute, that proxy is selected. In the case of selecting a "better" proxy, the process to switch to the better proxy will cause a prune to be sent to the original proxy and a join to be sent to the new ASBR. The pruning of the tree rooted at the original proxy will result in traffic loss, the duration of which will depend upon the time it takes to set up a tree with the new proxy. This Join/Prune process is repeated each time a "better" proxy is selected, resulting in network churned loss of state and other undesirable impact to the network.

SUMMARY

Various deficiencies in the prior art are addressed by a system, method and apparatus to resolve join packet RPF vector attribute conflicts in a network by adding an identified proxy to a proxy list, the proxy being valid if it is reachable and if a valid PIM adjacency exists on one of the next route hops, and selecting one of multiple valid proxies within the proxy list according to a hierarchy of selection mechanisms.

A method according to one embodiment comprises receiving, at a provider router (P-router) supporting multicast traffic, a join packet including a Reverse Path Forwarding (RPF) vector attribute identifying a proxy; adding the proxy to a proxy list and identifying the proxy as valid if the proxy is reachable and if a valid Protocol Independent Multicast (PIM) adjacency exists on one of the next route hops; in the case of multiple valid proxies within the proxy list, selecting one of the proxies as a preferred proxy.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The various embodiments discussed herein are applicable to numerous network topologies and protocols, such as Inter-AS MVPN, Multicast in BGP-free core and the like. These and other network configurations and protocols benefit from the various embodiments.

Figure 1:
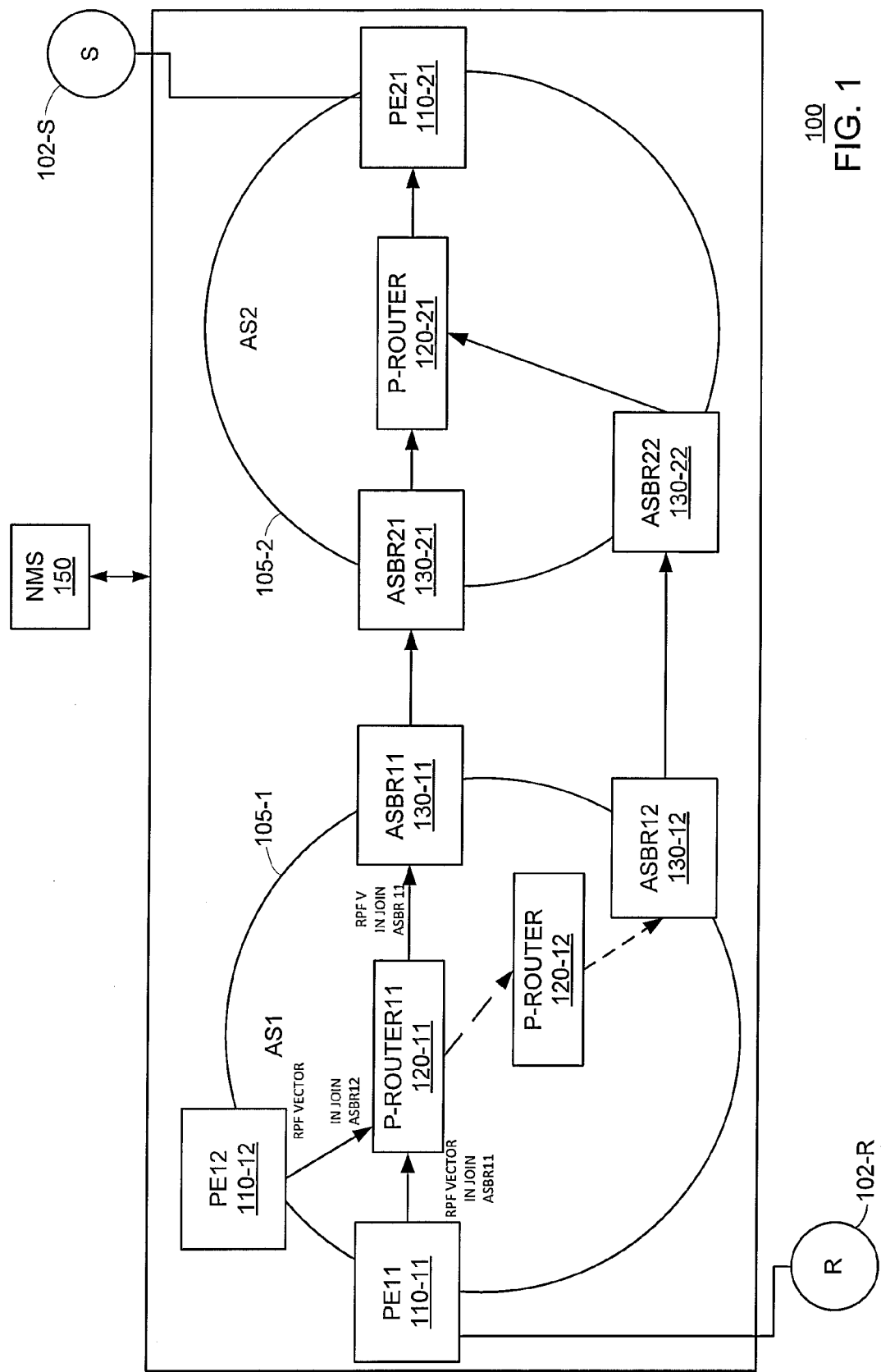
FIG. 1 depicts an exemplary Inter-AS MVPN network benefiting from the various embodiments.

FIG. 1 depicts a high level block diagram of a communication network architecture benefiting from various embodiments.

The architecture 100 includes two IP communication networks (CN) 105-1 and 105-2, where each communication network 105 is associated with a respective area. The architecture 100 also includes a plurality of Provider Edge (PE) routers 110, a plurality of provider (P) routers 120 and a plurality of Autonomous System Border Routers (ABSRs) 130.

The NMS 150 is a network management system adapted for performing the various management functions described herein. The NMS 150 is adapted to communicate with nodes of CN 105. The NMS 150 may also be adapted to communicate with other operations support systems (e.g., Element Management Systems (EMSs), Topology Management Systems (TMSs), and the like, as well as various combinations thereof).

The NMS 150 may be implemented at a network node, network operations center (NOC) or any other location capable of communication with the CN 105 and various elements related thereto. The NMS 150 may support user interface capabilities to enable one or more users to perform various network management, configuration, provisioning or control related functions (e.g., enter information, review information, initiate execution of various methods as described herein and the like). Various embodiments of the NMS 150 are adapted to perform functions as discussed herein with respect to the various embodiments. The NMS 150 may be implemented as a general purpose computing device or specific purpose computing device, such as described below with respect to FIG. 3.

The NMS 150 and the various routers 110-130 operate to support Resource Reservation Protocol (RSVP) Inter Domain Traffic Engineering Label Switched Paths (TE LSPs) of type Contiguous LSP, such as defined in, for example, IETF RFC4726 and RFC5151.

First area 105-1 comprises first and second PE routers 110-11 and 110-12, first and second P-routers 120-11 and 120-12, and first and second ASBRs 130-11 and 130-12. Second area 105-2 comprises a PE router 110-21, a P-router 120-21 and first and second ASBRs 130-21 and 130-22. Traffic between the two areas is conveyed between ASBRs 130-11 and 130-21, or between ASBRs 130-12 and 130-22.

FIG. 1 depicts source 102-S streaming content to receiver 102-R via a PIM MDT tree having PE 110-21 as a root PE and PE 110-11 as a leaf PE. The PIM MDT tree traverses various P-routers 120 and ASBRs 130 within the areas CN 105. In this example, at leaf PE PE110-11, the route to root PE 110-21 indicates a next-hop of ASBR 130-11. Similarly, at leaf PE 110-12, the route to root PE 110-21 indicates a next-hop ASBR 130-12. The P-routers 120 don't have reachability to PE 110-21. Thus, PEs 110-11 and 110-12 propagate PIM joins with ASBRs 130-11 and 130-12 as the proxy respectively.

Various embodiments provide a mechanism to resolve join packet RPF vector attribute conflicts in a network by adding an identified proxy to a proxy list if valid, where the proxy is valid if it is reachable and if a valid PIM adjacency exists on one of the next route hops, and selecting one of multiple valid proxies within the proxy list according to a hierarchy of selection mechanisms.

Various embodiments provide a mechanism whereby a make before break procedure is employed within the context of selecting a new "better" or preferred ASBR. Methodology according to the various embodiments is implemented within P-routers within the various areas.

Figure 2:
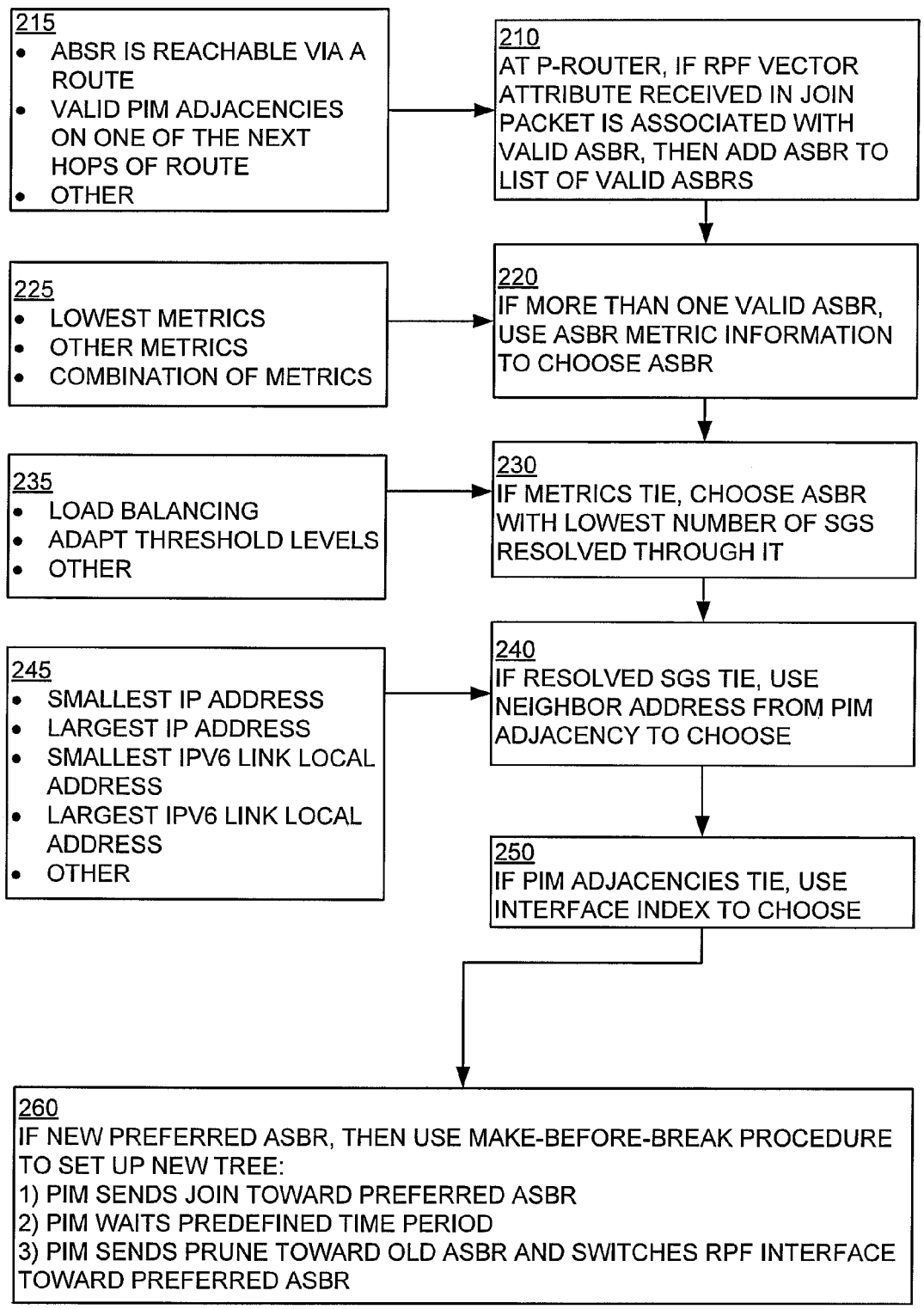
FIG. 2 depicts a flow diagram of a method according to one embodiment.

FIG. 2 depicts a flow diagram of a method to resolve join packet RPF-Vector attribute conflicts according to one embodiment. Specifically, FIG. 2 depicts a method 200 providing a preferred ASBR join/prune mechanism adapted to avoid multicast traffic loss such as within the context of inter-AS multicast VPN. The method 200 is suitable for implementation at P-routers and other network elements within the various CN areas. Various embodiments operate to select a preferred ASBR from among one or more valid ASBRs for use as a root PE within a multicast tree.

At step 210, at a P-router such as P-router 120-11, a join packet including an RPF vector attribute associated with or indicating a preferred ASBR is received. The ASBR is added to a list of ASBRs maintained by the P-router and previously received from other downstream routers. The P-router will then validate the ASBR. Referring to box 215, the ASBR is valid if (1) the P-router can find a route to the ASBR (i.e., the ASBR is reachable via a route); and (2) if there are valid PIM adjacencies on one of the next hops of the route. Other criteria may also be used to define whether or not a particular ASBR will be deemed as valid.

At step 220, if the list of ASBRs includes more than one valid ASBR, then the ASBR metric information is used to choose one of the valid ASBRs as a preferred ASBR. Referring to box 225, the tiebreak criteria may comprise choosing a lowest metric (lowest number of intervening hops), some other metric (lowest congestion level, highest bandwidth level and the like) or some combination of metrics.

At step 230, if the result of step 220 is a tie, then the ASBR (from among the step 220 result) with the lowest number of multicast source, groups (SGs) resolved through it is used as the preferred ASBR. That is, given two or more valid ASBRs exhibiting substantially similar metrics in terms of topology capability (as determined at step 220), the actual loading of the ASBRs as indicated by the supported multicast SGs is used to choose the preferred ASBR. Referring to box 235, this mechanism provides load balancing among ASBRs of comparable metrics. It is further noted that threshold levels may also be adapted depending on system operator criteria and the like. For example, different ASBRs may have different capabilities and, therefore, a percentage utilization level or some other criteria may be used to choose rather than the specific number of resolved SGs resolved through the ASBRs. Other load-related criteria may also be used for this purpose.

At step 240, if the result of step 230 is a tie, then the neighbor address associated with a PIM adjacency is used to choose one of the valid ASBRs. Referring to box 245, the specific adjacency may comprise the node with the smallest IP address or the node with the largest IP address. Within the context of an IPv6 system, the smallest or largest link local address may be used for this purpose. Other address-related criteria may also be used for this purpose (odd/even and so on).

At step 250, if the result of step 240 is a tie, then the interface index mechanism is used to choose the preferred ASBR.

Generally speaking, the various embodiments are adapted to validating identified proxies and, if necessary, selecting one of multiple valid proxies within a valid proxy list according to a hierarchy of selection mechanisms. While the hierarchy of selection mechanisms is presented in a particular order, it will be appreciated by those skilled in the art that changes to this order may be employed within the context of the various embodiments. Thus, in various embodiments, the selection mechanisms described herein with respect to the various steps (e.g., steps 220-250) may be arranged in different order than presented herein.

At step 260, if the P-router has already setup a Join with an ASBR and a new ASBR becomes a preferred ASBR, then PIM will use a make-before-break procedure to setup a tree with the preferred ASBR. In one embodiment, the procedure comprises sending a join toward the preferred ASBR and waiting for a predefined time period (e.g., 50 ms, 80 ms and the like depending upon network speed and the like). After the predetermined time period has elapsed, PIM sends a prune toward the old ABSR and switches the RPF interface toward the preferred ASBR. It is noted that before the switch, the P-router continues to forward traffic from the old ASBR since the RPF interface still point to the old ASBR.

The above-described embodiments provide a join/prune mechanism adapted to avoid multicast traffic loss, retain PIM state and avoid network churn, such as within the context of selecting a preferred ASBR for inter-AS multicast VPN. Advantageously, various embodiments also provide ASBR load balancing functionality.

Referring to FIG. 1, assume that PE router 110-11 originates a PIM Join for (S1, G1) with RPF vector as ASBR 130-11, and that PE 110-12 originates a PIM Join for (S1, G1) with RPF vector as ASBR 130-12. That is, PE router 110-11 prefers traffic from ASBR 130-11 while PE router 110-12 prefers traffic from ASBR 130-12. The two join messages are propagated to P-router 120-11. At the P-routers 120, it is assumed that ASBRs 130 are valid.

Assuming that P-Router 120-11 does not have a (S1, G1) state, it will respond to the first received join message.

If P-Router 120-11 receives the join message from PE router 110-12 first (with ASBR 130-12 as the RPF actor), P-router 120-11 will create a (S1, G1) state and choose ASBR 130-12 as the preferred ASBR. For the next section assume the metric to reach ABSR 130-12 is "2" and the metric to reach ABSR 130-11 130-11 is "1" (wherein a lower metric is deemed "better").

If P-Router 120-11 subsequently receives the join message from PE router 110-11 (with ASBR 130-11 as the RPF actor), P-router 120-11 will see that at this time, both ASBR 130-11 and 130-12 are listed as valid with respect to (S1, G1).

The P-router 120-11 must choose a preferred ASBR from among the two valid ASBRs in its list. In this example, the P-router will successfully implement step 220 of the method 200 in that the ASBR with the lowest metric (ASBR 130-11 with a metric of "1") will be selected as the preferred ASBR.

Since the selected preferred ASBR is a new ASBR, the P-router 120-11 will implement step 250 of the method 200, utilizing the make-before-break procedure to set up a tree with the new preferred ASBR. That is, the join is propagated toward ASBR 110-11 and, after a predetermined time delay (e.g., 50 ms), a prune is propagated toward ASBR 110-12. It is noted that P-router continues to forward traffic from the old ASBR while the RPF interface still points to the old ASBR.

The above-described embodiments prevent or minimize multicast traffic loss in inter-AS multicast VPN scenarios by using a sequence of various metrics to determine a preferred ASBR and, optionally, improve network utilization and load balancing among ASBRs It is noted that the above-describe embodiments may also be adapted to prevent or minimize multicast traffic loss in other types of networks and/or protocols, such as a BGP-free Multicast core network.

Figure 3:
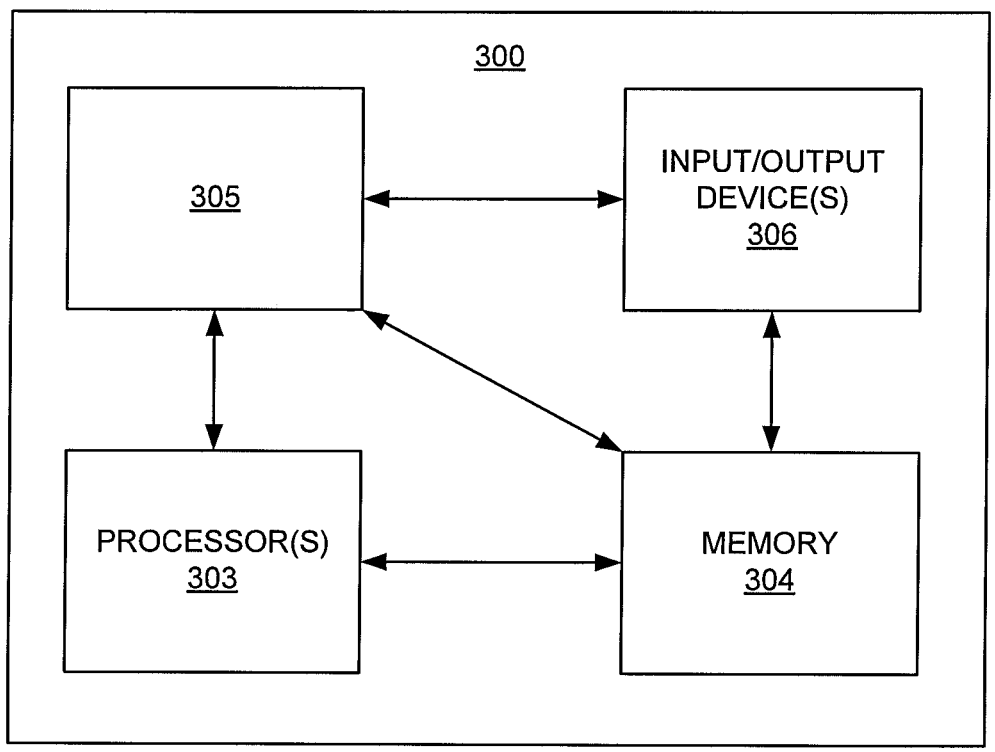
FIG. 3 depicts a high level block diagram of a computer suitable for use in performing functions described herein.

FIG. 3 depicts a high level block diagram of a computer suitable for use in performing functions described herein, such as at any of the Provider Edge (PE) routers 110, provider (P) routers 120, Autonomous System Border Routers (ABSRs) 130 and/or NMS 150.

As depicted in FIG. 3, computer 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., solid state memory, magnetic or optical drive or diskette, and the like.

It will be appreciated that computer 300 depicted in FIG. 3 provides a general architecture and functionality suitable for implementing functional elements described herein or portions network of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
   receiving, at a provider router (P-router) supporting multicast traffic, a join packet including a Reverse Path Forwarding (RPF) vector attribute identifying a proxy;
   adding, at the P-router, the proxy to a proxy list;
   identifying, by the P-router, the proxy as being valid if the proxy is reachable by the P-router and if a valid Protocol Independent Multicast (PIM) adjacency exists on one of the next route hops;
   in the case of multiple valid proxies within the proxy list, selecting, at the P-router, one of said multiple valid proxies as a preferred proxy, where the selected preferred proxy being different than an existing proxy;
   sending a join message toward the preferred proxy; and
   waiting a predetermined amount of time before sending a prune message toward the existing proxy.

2. The method of claim 1, wherein said sending the join and prune messages are parts of performing a make-before-break procedure to set up a multicast tree using the preferred proxy for the multicast traffic.

3. The method of claim 2, wherein said make-before-break procedure comprises:
   sending, via a PIM, the join message toward the preferred proxy;
   waiting for the predetermined amount of time;
   sending, via the PIM, the prune message toward the existing proxy; and
   switching a multicast traffic RPF interface towards the preferred proxy.

4. The method of claim 1, wherein the preferred proxy selection is made using a proxy metric associated with the proxy.

5. The method of claim 4, wherein said proxy metric comprises one or more of an intervening hop number, a congestion level and a bandwidth level.

6. The method of claim 1, wherein the preferred proxy selection is made using an indication of proxy load associated with the proxy.

7. The method of claim 6, wherein said indication of proxy load comprises an Autonomous System Border Routers (ASBR) utilization level.

8. The method of claim 6, wherein said indication of proxy load comprises a number of multicast source, groups (SGs) presently resolved by the proxy.

9. The method of claim 1, wherein the preferred proxy selection is made using PIM neighbor address adjacency information.

10. The method of claim 9, wherein said PIM neighbor address adjacency information comprises one of a smallest IP address of an adjacent node and a largest IP address of an adjacent node.

11. The method of claim 9, wherein said PIM neighbor address adjacency information comprises one of a smallest link local address of an adjacent node and a largest link local address of an adjacent node.

12. The method of claim 1, wherein the preferred proxy selection is made using an interface index mechanism.

13. The method of claim 4, wherein if the preferred proxy selection using a proxy metric associated with the proxy results in a tie, then the preferred proxy selection is made using one or more additional metrics associated with the proxy.

14. The method of claim 4, wherein if the preferred proxy selection using a proxy metric associated with the proxy results in a tie, then the preferred proxy selection is made using an indication of load associated with the proxy.

15. The method of claim 14, wherein if the preferred proxy selection using an indication of load associated with the proxy results in a tie, then the preferred proxy selection is made using PIM neighbor address adjacency information.

16. The method of claim 15, wherein if the preferred proxy selection using PIM neighbor address adjacency information results in a tie, then the preferred proxy selection is made using an interface index mechanism.

17. The method of claim 1, wherein the preferred proxy selection is made according to a hierarchical decision tree including at least two of:
a metric associated with the proxy, an indication of load associated with the proxy, PIM neighbor address adjacency information and an interface index mechanism.

18. An apparatus, comprising a processor configured for:
receiving, at a provider router (P-router) supporting multicast traffic, a join packet including a Reverse Path Forwarding (RPF) vector attribute identifying a proxy;
adding, at the P-router, the proxy to a proxy list;
identifying, by the P-router, the proxy as being valid if the proxy is reachable by the P-router and if a valid Protocol Independent Multicast (PIM) adjacency exists on one of the next route hops;
in the case of multiple valid proxies within the proxy list, selecting, at the P-router, one of said multiple valid proxies as a preferred proxy, where the selected preferred proxy being different than an existing proxy;
sending a join message toward the preferred proxy; and
waiting a predetermined amount of time before sending a prune message toward the existing proxy.

19. A tangible and non-transient computer readable storage medium storing instructions which, when executed by a computer, adapt the operation of the computer to provide a method, comprising:
receiving, at a provider router (P-router) supporting multicast traffic, a join packet including a Reverse Path Forwarding (RPF) vector attribute identifying a proxy;
adding, at the P-router, the proxy to a proxy list;
identifying, by the P-router, the proxy as being valid if the proxy is reachable by the P-router and if a valid Protocol Independent Multicast (PIM) adjacency exists on one of the next route hops;
in the case of multiple valid proxies within the proxy list, selecting, at the P-router, one of said multiple valid proxies as a preferred proxy, where the selected preferred proxy being different than an existing proxy;
sending a join message toward the preferred proxy; and
waiting a predetermined amount of time before sending a prune message toward the existing proxy.

20. A non-transitory computer program product wherein computer instructions stored in a non-transitory computer readable memory, when processed by a computer, adapt the operation of the computer to provide a method, comprising:
receiving, at a provider router (P-router) supporting multicast traffic, a join packet including a Reverse Path Forwarding (RPF) vector attribute identifying a proxy;
adding, at the P-router, the proxy to a proxy list;
identifying, by the P-router, the proxy as being valid if the proxy is reachable by the P-router and if a valid Protocol Independent Multicast (PIM) adjacency exists on one of the next route hops;
in the case of multiple valid proxies within the proxy list, selecting, at the P-router, one of said multiple valid proxies as a preferred proxy, where the selected preferred proxy being different than an existing proxy;
sending a join message toward the preferred proxy; and
waiting a predetermined amount of time before sending a prune message toward the existing proxy.

21. The apparatus of claim 18, wherein said sending the join and prune messages are parts of performing a make-before-break procedure to set up a multicast tree using the preferred proxy for the multicast traffic.

22. The tangible and non-transient computer readable storage medium of claim 19, wherein said sending the join and prune messages are parts of performing a make-before-break procedure to set up a multicast tree using the preferred proxy for the multicast traffic.

23. The non-transitory computer program product of claim 20, wherein said sending the join and prune messages are parts of performing a make-before-break procedure to set up a multicast tree using the preferred proxy for the multicast traffic.

* * * * *